Jan. 19, 1926. 1,570,557
B. A. DICKSON
MAP
Filed Nov. 17, 1924
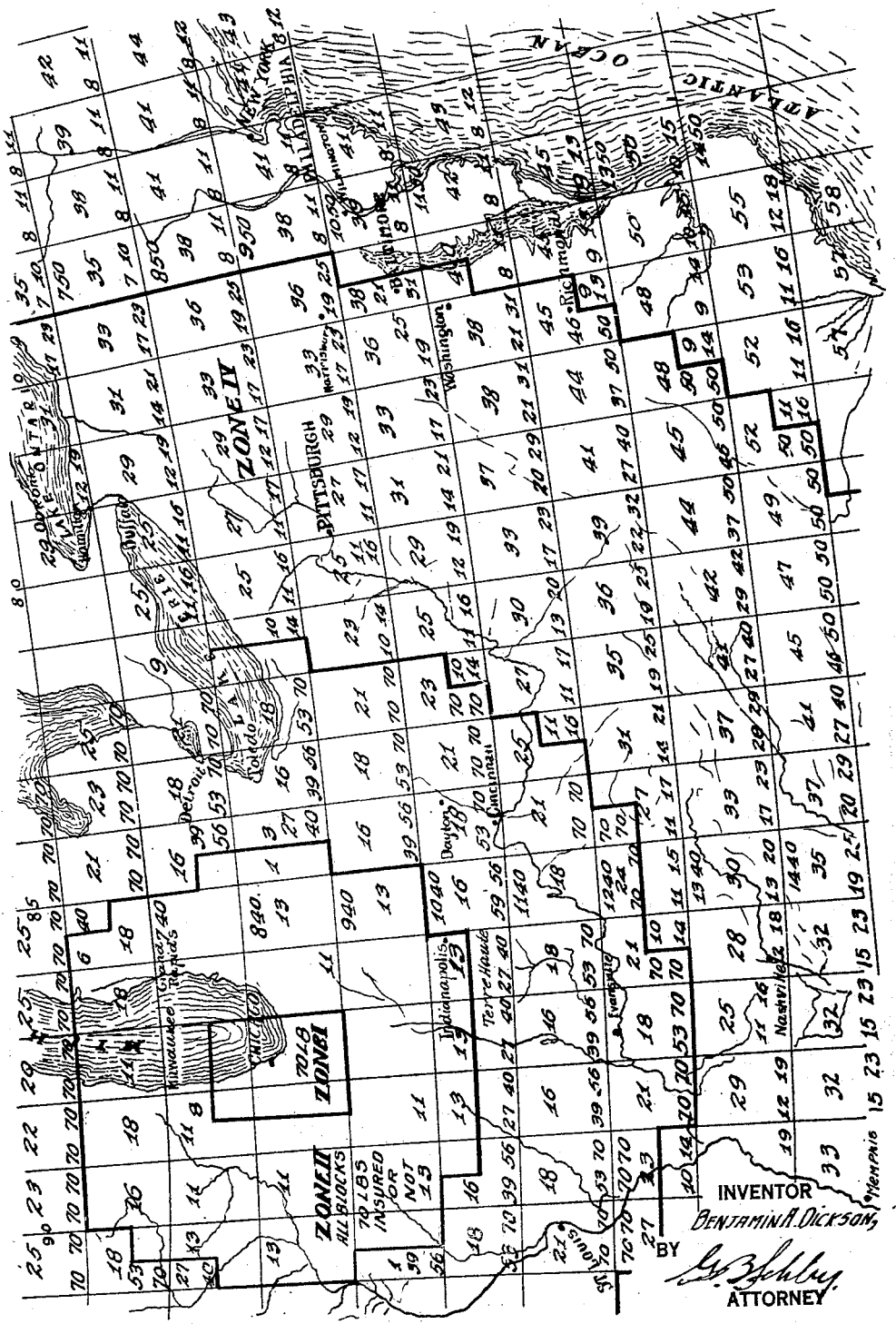
INVENTOR
Benjamin A. Dickson
BY
ATTORNEY Patented Jan. 19, 1926.

1,570,557

UNITED STATES PATENT OFFICE.

BENJAMIN A. DICKSON, OF INDIANAPOLIS, INDIANA.

MAP.

Application filed November 17, 1924. Serial No. 750,298.

*To all whom it may concern:*

Be it known that I, BENJAMIN A. DICKSON, a citizen of the United States, residing at Indianapolis, in the county of Marion and State of Indiana, have invented a new and useful Map, of which the following is a specification.

Shippers of commodities are frequently confronted with the problem of determining which of two shipping agencies is the more economical to employ in shipping a given package or article.

Shipping charges depend upon the weight of the parcel to be shipped and upon the distance between shipping points and destinations and possibly upon other facts. Different shipping agencies employ different systems of charging; and as a result, it is in the vast majority of cases more economical to ship by one agency parcels of certain weights and by another agency parcels of other weights. The shipper, being desirous of saving expense, chooses, if possible, that shipping agency which will be most economical for the particular parcel or article he is shipping. It is the object of my invention to facilitate this choice.

I accomplish the above object by superimposing upon a map certain data which will enable the shipper to choose the most economical shipping agency to employ.

The accompanying drawing illustrates a form of my invention which is adapted for the use of a shipper located in Chicago, by means of which such shipper can be immediately informed as to which of the two shipping agencies, parcel post or express, is more economical to employ in shipping parcels of any given weight into or out of Chicago. A map embodying my invention may be of any convenient scale and may cover any desired amount of territory. Preferably, I employ maps showing the entire United States, a fragment of such a map being illustrated in the accompanying drawing.

For the purpose of setting their rates, the express companies divide the country into "blocks" measuring one degree on each side. These blocks are numbered for purposes of identification, the numbering starting with block No. 100, arbitrarily located off the coast of Washington, and running consecutively eastward. The block immediately under block No. 100 is numbered 200 and the blocks to the east of the block 200 are numbered consecutively. This system of numbers is carried out to embrace the entire territory of the United States. For convenience, I prefer to make it possible to identify the number of any block on my map; and to this end, I show the block numbers for each block in every tenth north and south column. On the drawing, block numbers are in the upper part of each numbered block. Thus the block in which Wilmington, Delaware, is located is numbered 1050. The block north of this is numbered 950 and the one to the south is numbered 1150. The number of the block west of Wilmington is 1049.

Express rates between any two given blocks are determined from arbitrary scales fixed by the express companies, each scale showing the express charge for packages of any weight. As each of my maps is designed for the use of a shipper located at a particular base point—in this case, in Chicago, (located in block number 838)—I can indicate in each block the express scale from which are determined charges on shipments between such base point and that block; the number of this express scale being shown near the center of each block. Thus, the charges on a shipment from Chicago to Wilmington will be determined from express scale No. 39, those on a shipment from Chicago to Pittsburgh by express scale No. 27, those on shipments from Chicago to Indianapolis by express scale No. 13, and so on.

The express scales are so arranged in comparison to parcel post rates that express charges are less than parcel post charges on parcels of relatively large weight and greater than parcel post charges on parcels of relatively small weight. With reference to any base point (Chicago in the map shown), there is then a certain weight above which it is cheaper to ship by express and below which it is cheaper to ship by parcel post. In general, I can therefore indicate on my map the limiting weight for each block, above which weight it is cheaper to ship by express and below which it is cheaper to ship by parcel post. This limiting weight is, in most instances, indicated in the lower right-hand corner of each block. Thus, the figure 31 appearing in the lower right-hand corner of the block in which Washington, D. C., is located indicates that parcels of less than 31 pounds may be shipped from Chicago to Washington by parcel post at a lower cost than they can be shipped by express; while parcels above 31 pounds in weight are more cheaply shipped by express between these two points.

If a shipper by parcel post wishes to insure the shipment, the insurance charge will alter the limiting weight above which express is cheaper and below which parcel post is cheaper. This limiting weight in the case of insured parcel post of course varies with the amount of insurance carried. Since the express companies' liability is $50.00 without extra charge, I prefer to indicate on my map the limiting weights on packages insured to that value, as then the liabilities of both agencies will be equal. This limiting weight on insured parcel post I have located in most instances, in the lower left-hand corner of each block. Thus, the Figure 21 appearing in the lower left-hand corner of the block in which Washington, D. C., is located indicates that parcels of less than 21 pounds may be shipped from Chicago to Washington by insured parcel post at less cost than they can be shipped by express. Above 21 pounds, shipment by express is more economical.

In certain cases, I find it advisable, in order to simplify the map and to avoid confusion, to place the numbers indicating the limiting weights in positions other than those described above. Thus, lines bounding the parcel post zones do not in all instances coincide with the lines bounding the express blocks, and in such cases I find it convenient to vary the location of the figures indicating these limiting weights in those blocks which are cut by zone boundary lines. Thus, block number 1241 lies partly in Zone III and partly in Zone IV. For that part of block 1241 lying in Zone III, the limiting weight up to which parcels may be shipped by parcel post more economically than by express is 70 pounds, whether the package is insured or not. I have indicated this by the number 70 appearing twice in the upper left-hand corner of this block. The number 11 in the lower left-hand corner of this block indicates that for the remainder of the block 11 pounds is the limiting weight up to which insured parcel post is more economical than is express; and the number 17 in the lower right-hand corner of the block indicates that for that part of the block lying in Zone IV 17 pounds is the limiting weight up to which parcel post uninsured is a cheaper shipping agency than is express. Where blocks are divided by zone boundary lines and two numbers appear one above the other, the upper number indicates the limiting weight for insured parcel post and the lower number the limiting weight for uninsured parcel post. This precise arrangement of numbers is chosen because of its convenience, and it does not form any part of my invention. Another instance in which I find it convenient to depart from my usual method of placing the limiting weights in the lower corners of each block is illustrated on the map in Zone II. For all blocks in that zone, the limiting weight is 70 pounds, insured or uninsured, and I prefer, therefore, to indicate this fact with a legend to that effect, rather than to repeat the number "70" twice in each block.

To illustrate the application of my invention, let it be assumed that a shipper in Chicago is shipping a package to Richmond, Virginia, and desires to know the most economical shipping agency to employ. He is informed from my map that if he desires insurance on the shipment it will be cheaper to ship by parcel post if the parcel weighs less than 46 pounds; if more than 46 pounds, by express. If insurance is not desired, he may ship up to 50 pounds more economically by parcel post than he can by express. If the limiting weights indicate that parcel post is the cheaper shipping agency, the shipper calculates the shipping charges from the weight of the parcel and the rate between Chicago and Richmond, Virginia, which latter city the map shows is in Zone IV. Should the map indicate that express is cheaper than parcel post, the shipper is advised that the charges on the shipment will be determined from express scale No. 45. Thus, my map not only serves to indicate the more economical agency to employ, but also aids the shipper in determining the transportation charge on the shipment.

I have described my invention and its use as applied to a shipper located in Chicago. However, it is evident that my map is equally applicable to the determination of economical shipping agencies to be employed for shipments into Chicago, as the shipping charges between two points will be the same irrespective of which point is the destination. To take advantage of this feature, a consignee located in Chicago can instruct a shipper to ship all parcels under the limiting weight by parcel post and parcels over such weight by express. Since he gives in his shipping directions the limiting weight between the two services he can insure that his shipment will be shipped by the more economical agency without the necessity of knowing the weight of the shipment at the time his order is placed, and also he is enabled to charge back to the shipper excess charges resulting from the shipper's failure to follow his instructions.

I claim as my invention:—

1. A map for determining the more economical of two shipping agencies to be employed in shipping parcels to or from a certain base point, said map being divided into a plurality of blocks and having designations in each block indicating the limiting weight below which parcels may be shipped at less cost by one agency than by the other.

2. A map divided into a plurality of blocks and having designations in each block indicating the limiting weight below which parcels may be shipped at less cost by parcel post than by express between such block and a certain base point.

3. A map as set forth in claim 2 with the addition in each block of the designation identifying the express scale by which is determined the shipping charges on shipments between such block and said base point.

4. A map as set forth in claim 2 having boundary lines for the parcel post zones with reference to said base point.

5. A map as set forth in claim 2 having boundary lines for the parcel post zones with reference to said base point, and also having in each block a designation identifying the express scale by which is determined the shipping charges on shipments between such block and said base point.

In witness whereof, I have hereunto set my hand at Indianapolis, Indiana, this 6th day of November, A. D. one thousand nine hundred and twenty four.

BENJAMIN A. DICKSON.